United States Patent
Parlow et al.

(10) Patent No.: US 9,701,251 B2
(45) Date of Patent: Jul. 11, 2017

(54) VEHICLE CARGO AREA PACKAGE TRAY STORAGE SYSTEM

(71) Applicant: FORD GLOBAL TECHNOLOGIES, LLC, Dearborn, MI (US)

(72) Inventors: Kathleen M. Parlow, Columbus, MI (US); Nicholas Alphonse Billardello, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/597,248

(22) Filed: Jan. 15, 2015

(65) Prior Publication Data

US 2016/0207467 A1    Jul. 21, 2016

(51) Int. Cl.
*B60R 7/02* (2006.01)
*B60R 5/04* (2006.01)
*B60R 7/08* (2006.01)

(52) U.S. Cl.
CPC ............ *B60R 7/02* (2013.01); *B60R 5/044* (2013.01); *B60R 7/08* (2013.01)

(58) Field of Classification Search
CPC  B60R 5/04; B60R 5/044; B60R 5/045; B60R 7/02
USPC ........... 296/24.44, 37.5, 37.7, 37.16, 100.02, 296/100.06, 136.03
See application file for complete search history.

(56) References Cited

U.S. PATENT DOCUMENTS

| | | | |
|---|---|---|---|
| 5,716,091 A * | 2/1998 | Wieczorek | B60R 7/02 224/275 |
| 6,050,202 A | 4/2000 | Thompson | |
| 6,241,137 B1 | 6/2001 | Corr | |
| 7,270,360 B2 | 9/2007 | Frasure et al. | |
| 7,758,092 B2 * | 7/2010 | Kolpasky | B60R 5/045 296/24.43 |
| 7,794,004 B2 | 9/2010 | Aebker et al. | |
| 7,806,453 B2 * | 10/2010 | Aebker | B60R 5/045 296/37.16 |
| 8,757,695 B2 * | 6/2014 | Dinger | B60R 7/02 296/37.5 |
| 2009/0072567 A1 * | 3/2009 | Bohlke | B60R 5/045 296/37.5 |

FOREIGN PATENT DOCUMENTS

FR    2842150 A1 *    1/2004 ............. B60R 5/044

OTHER PUBLICATIONS

English translation of FR 2842150; retreived on Jun. 14, 2016 via PatentTranslate located at www.epo.org.*

* cited by examiner

*Primary Examiner* — Jason S Daniels
(74) *Attorney, Agent, or Firm* — Vichit Chea; Brooks Kushman P.C.

(57) ABSTRACT

A cargo area for a vehicle includes a package tray behind the rear seat having an upper surface and a lower surface. The package tray is rotated about an axis to uncover the cargo area. The cargo area further includes a container detachably or permanently attached to the lower surface of the panel. The container may define one or more receptacles that are accessible when the panel is raised and lowered when the package tray is lowered to a horizontal orientation above the cargo area.

16 Claims, 3 Drawing Sheets

//www.w3.org/1999/xhtml">
VEHICLE CARGO AREA PACKAGE TRAY STORAGE SYSTEM

TECHNICAL FIELD

The present disclosure relates to storage systems for vehicles.

BACKGROUND

Cargo areas for vehicles aid in storing items necessary for travel. These cargo areas may be covered with a panel or package tray. Further, the panel or package tray may rotate to uncover the cargo area when the rear lift gate is unlatched. This allows for easy access to items that may be stored within the cargo area. In compact cars, this cargo space may be limited. Certain products may be used to organize the items stored within the cargo area. These products may not efficiently use space within the cargo area.

Packaging space within the storage area is important. Consumers may use a storage area to secure cargo required for travel. It may be advantageous to increase the packaging space of the storage area, or to provide a storage system to aid in organizing the packaging space of the storage area. It may be difficult to access items within the storage area. It is further advantageous to use a storage system that allows easy access to stored items.

Storage options for vehicles are generally limited. A vehicle may use traditional storage areas, such as the glove box, console bin, and seatback pockets. The storage options are generally fixed and not configurable. Using fixed areas and non-configurable designs limit the use of storage options within the vehicle. Packaging space for traditional storage areas may be limited or constrained to allow storage of only certain items. Storage options that are fixed and not removable from the vehicle also limit the use of the storage options. This results in a less efficient use of the packaging space within the storage options. A consumer must then store an external storage option within the vehicle for use when away from the vehicle.

The storage options are primarily focused on being within reach of a vehicle passenger. This may present conflicts and limit the items a consumer may need for travel. A consumer may be more likely to store an item that requires more frequent use, such as a map. Being limited in packaging space, the storage option within reach of the consumer may only be configured to store a single item such as a map. A consumer may need additional storage options for items such as road flares, camping equipment, or a roadside repair kit. These items may be used by the consumer less frequently, but may still be required for travel. Creating packaging space in less conventional locations may provide the consumer with storage options for items used less frequently and result in safer travel.

This disclosure is directed to solving the above problems and other problems as summarized below.

SUMMARY

A vehicle storage system includes a panel hingedly connected to a rear portion of a vehicle. The panel has an upper surface and a lower surface. The lower surface is disposed over the storage area of the vehicle. The vehicle storage system further includes a container attached with the lower surface of the panel. The container defines a receptacle.

A rear portion of a vehicle defining a cargo area includes a package tray disposed within the rear portion. The package tray has an upper surface and a lower surface covering the cargo area. The package tray is configured to rotate about an axis such that upon rotation the lower surface is projected toward the rear portion. The rear portion further includes a container attached with the lower surface of the package tray. The container defines a receptacle wherein the receptacle is accessible from the lower surface of the package tray.

A cargo area for a vehicle includes a panel having an upper surface and a lower surface. The lower surface is disposed opposite the upper surface. The panel is configured to rotate about an axis such that the lower surface uncovers the cargo area upon rotation. The cargo area further includes a container attached to the lower surface of the panel. The container defines a receptacle accessible when the panel rotates about the axis.

DETAILED DESCRIPTION

Embodiments of the present disclosure are merely examples and other embodiments can take various and alternative forms. The figures are not necessarily to scale and some features are exaggerated or minimized to show details of particular components. The structural and functional details disclosed are not to be interpreted as limiting, but merely as a representative basis for teaching one skilled in the art how to practice the present invention. The various features illustrated and described with reference to any one of the figures can be combined with features illustrated in one or more other figures to produce embodiments that are not explicitly illustrated or described.

Figure 1:
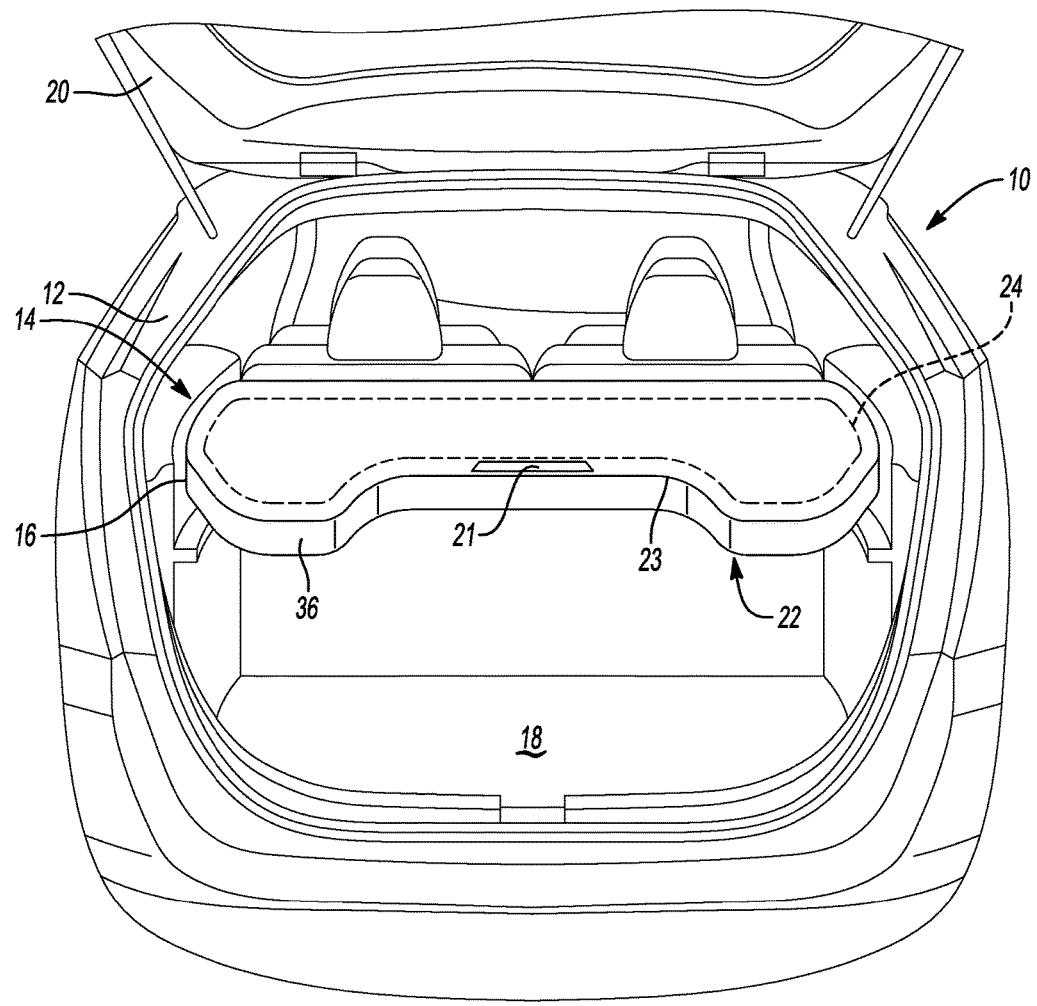
FIG. 1 is a rear view of a vehicle rear cargo container.

Referring to FIG. 1, a vehicle 10 having a rear portion 12 defining a cargo area 14 is shown. The cargo area 14 includes a package tray 16. The package tray 16 is disposed over a storage area 18. The vehicle 10 also includes a lift gate 20. The lift gate 20 may be hingedly connected to the rear portion 12 of the vehicle 10. The gate 20 may also be connected to the package tray 16.

The package tray 16 for the storage area 18 may not be considered a conventional storage option. The storage system 22 of the present disclosure utilizes a container 24 disposed on the package tray 16. This increases the packaging space of the storage area 18 and allows for easy access to the container 24 by the consumer. The package tray 16 may also be disconnected from the gate 20. The package tray may include a handle 21 connected to an upper surface 23 of the package tray 16. The handle 21 allows a consumer to open the package tray 16 and expose the storage area 18. Disconnecting the package tray 16 from the gate 20 allows a consumer to utilize the rear portion 12 of the vehicle 10 as a storage option when the storage items are not ideal for storage within the storage area 18, or when the storage area 18 is already being used to store items.

Figure 2:
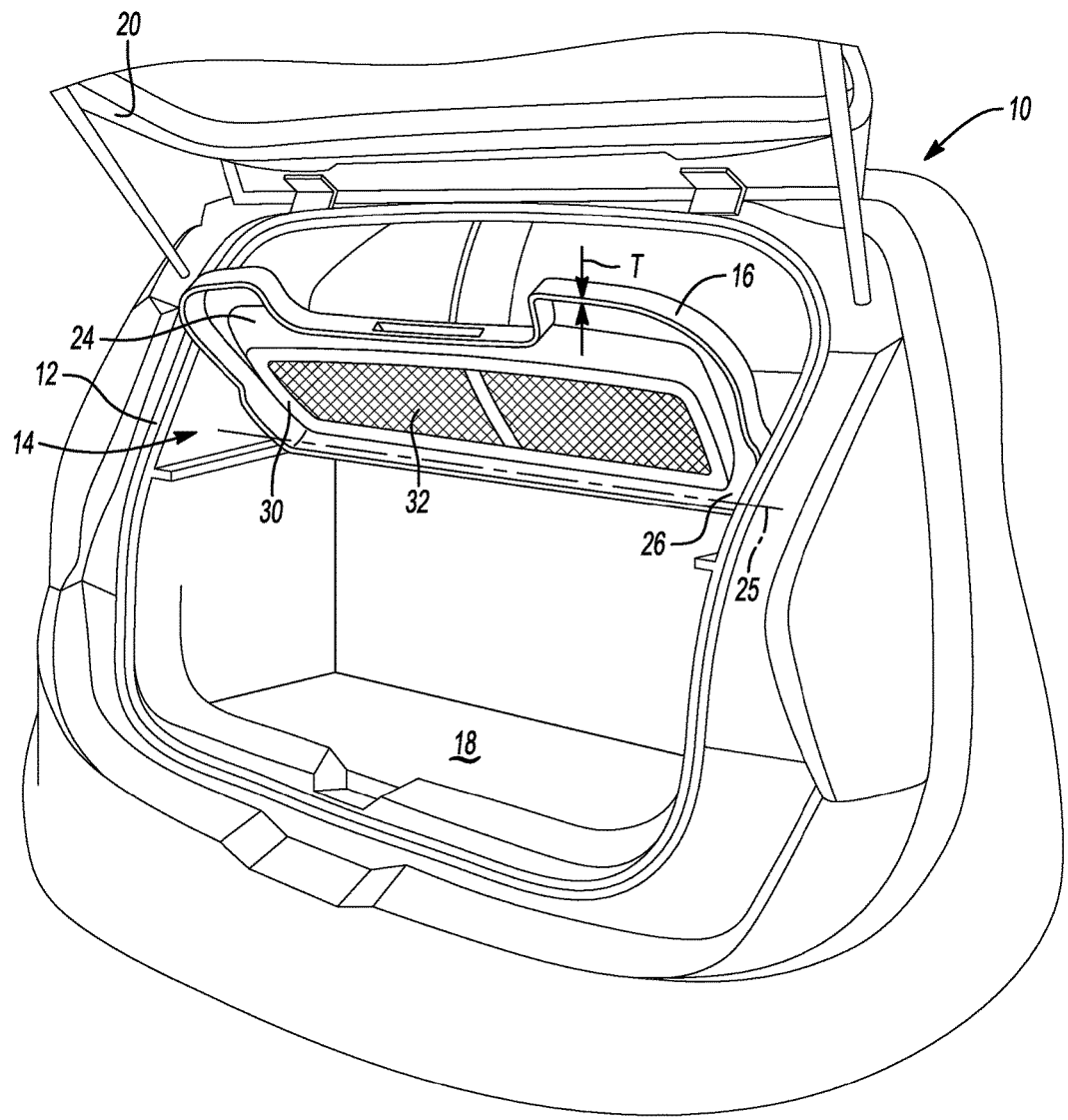
FIG. 2 is a rear perspective view of a vehicle having an elevated lift gate and cargo area package tray.

Referring to FIG. 2, a rear view of the rear portion 12, with an open gate 20 and package tray 16, of the vehicle 10 is shown. The package tray 16 may be hingedly connected to the cargo area 14. Opening the gate 20, via the latch mechanism (not shown), may cause the package tray 16 to rotate within the cargo area 14. When the gate 20 is open, the package tray 16 exposes the storage area 18. The container 24 may be attached to a lower surface 26 of the package tray 16. The lower surface 26 of the package tray 16 is the portion of the package tray 16 enclosed within the storage area 18. The container 24 is connected to the package tray 16 such that upon opening the gate 20 the container 24 rotates upwardly to face the rear portion 12 of the vehicle 10. The package tray 16 rotates about an axis 25 with the gate 20. Rotation of the package tray 16 about axis 25 raises the container 24 to face the rear portion 12 of the vehicle 10.

The container 24 may define a single receptacle 30 or a plurality of receptacles 30. The container 24 may be molded to the package tray 16, adhered to the package tray 16, or press-fit onto the package tray 16. The container 24 includes an access panel 32 to secure the receptacle 30. The access panel 32 may be a flexible material, or a rigid material. The access panel 32 may be a polymer composite, a metal alloy, or a fabric such as nylon or mesh. The access panel 32 may include netting to cover the receptacle 30 and to secure items within the container 24. Using a net as the access panel 32 allows a consumer to visually see the items stored in the container before opening the access panel 32. The access panel 32 may open using a latch mechanism, a spring actuated pin, a string, a button, or a slide mechanism. The access panel 32 provides for a zipper between the access panel 32 and the container 24 wherein movement of the zipper opens the access panel 32 and exposes the receptacle 30. The container 24 may provide for a single access panel 32 or a plurality of access panels 32.

The package tray 16 is configured to support the additional weight from the container 24 as well as the items stored within the container 24. The package tray 16 may be a panel composed of a polymer composite of sufficient thickness T or structural shape to support the container 24 as well as the items stored within the receptacle 30 of the container 24. The thickness T or structural shape of the package tray 16 allows items to be stored within the receptacle 30 of the container 24 without deforming the package tray 16 or collapsing into the storage area 18. The package tray 16 may use an increased thickness T, a rigid material, or any shape that may be configured to support the weight of the container 24. Further, the package tray 16 may also use a combination of a thickness T, material composition, or structural shape to support the weight of the container 24 and the items stored within the receptacle 30 of the container.

Figure 3:
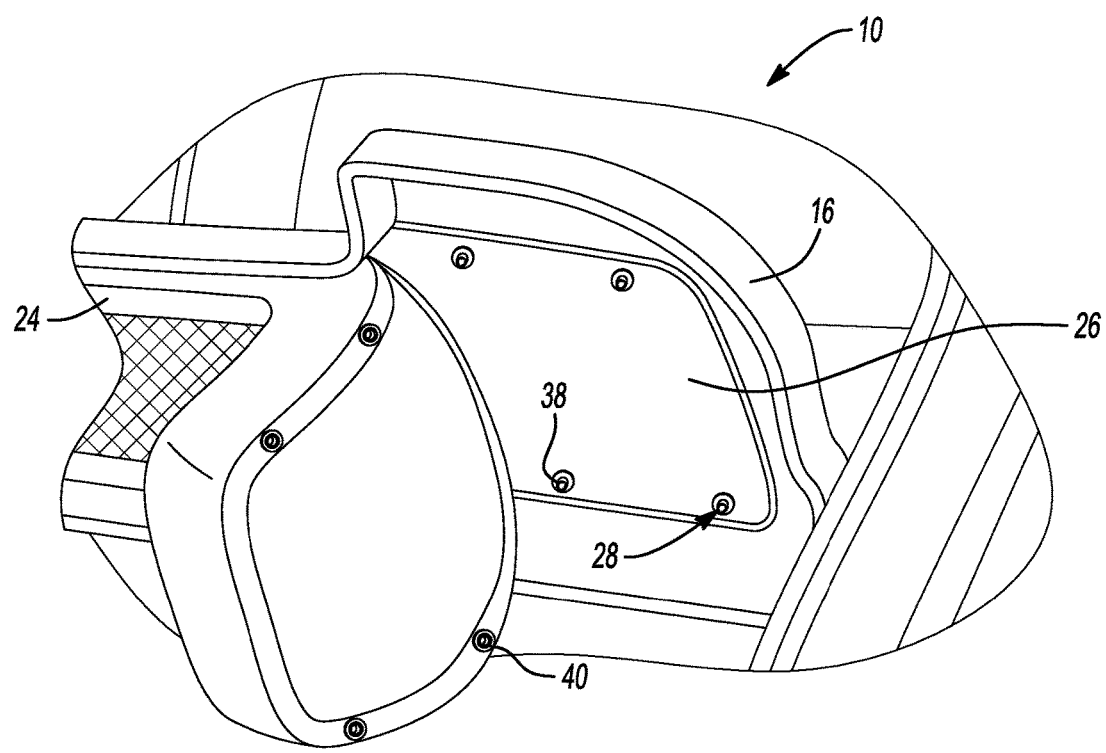
FIG. 3 is a fragmentary view of a rear of a vehicle having a removable container on the underside of the cargo area package tray.

Referring to FIG. 3, the container 24 is shown detached from the lower surface 26 of the package tray 16. The container 24 is attached to the lower surface 26 of the package tray 16 using a plurality of snaps 28. The plurality of snaps 28 may be insert molded to the lower surface 26 of the package tray 16. The plurality of snaps 28 allow the container 24 to separate from the lower surface 26 of the package tray 16. Separating the container 24 from the package tray 16 may provide easier access to the container 24 and allows the container 24 to be transported outside the vehicle. This allows for convenient storage and transport of items to locations other than the vehicle 10. This also allows for ability to easily clean the storage container if needed.

The plurality of snaps 28 may include a snap 38 attached to the lower surface 26 of the package tray 16 and a snap receptacle 40 attached with the container 24. The snap 38 and the snap receptacle 40 interlock when aligned and pressure is applied to either the snap 38 or the snap receptacle 40. Engagement between the snap 38 and the snap receptacle 40 secures the container 24 to the lower surface 26 of the package tray 16 while maintaining the ability to remove the container 24 from the package tray 16.

When the package tray 16 is closed, covering the storage area 18, the weight of the container 24 may act toward the storage area 18. The snap 38 and the snap receptacle 40, when interlocked, transfer the weight of the container 24 to the package tray 16. The plurality of snaps are depicted in FIG. 3 as button type snaps 28 wherein the snap features 28 resemble a button. Other snap features 28 may also be utilized. The plurality of snap features 28 may include, but are not limited to hook and loop strips adhered to the container 24 and the lower surface 26 of the package tray 16, a plurality of clips disposed along the lower surface 26 of the package tray 16 that clip to the container 24, or a pin and groove feature in which a pin engages a groove disposed between a plurality of flexible protrusions.

What is claimed is:

1. A vehicle storage system comprising:
   a package tray having a lower surface, and hingedly connected to a vehicle, wherein the package tray enclosing encloses a storage area in a closed position, and faces a lift gate in an open position; and
   a container having a lower wall that defines an access panel, the container being attached to the lower surface, wherein the wall that defines the access panel faces the lift gate in the open position.

2. The vehicle storage system of claim 1, further comprising a plurality of snaps formed on the lower surface of the package tray configured to attach the container to the lower surface.

3. The vehicle storage system of claim 2, wherein the container is formed with a plurality of snaps complementary to the snaps on the lower surface of the package tray wherein the snaps are configured to engage and disengage the container from the lower surface of the package tray.

4. The vehicle storage system of claim 1, wherein the container is molded to the package tray.

5. The vehicle storage system of claim 1, wherein the container is accessible using a zipper.

6. The vehicle storage system of claim 1, wherein the container is not visible when the package tray is in the closed position.

7. A rear portion of a vehicle defining a cargo area comprising:
   a package tray disposed above the cargo area, the package tray having a lower surface covering the cargo area configured to rotate an axis to face a lift gate of the vehicle; and
   a container attached to the lower surface of the package tray, and having
   an access panel being a lower side of the container, and oriented substantially parallel to the lower surface, wherein the access panel is configured to face the lift gate to be accessible when the package tray is rotated to face the lift gate.

8. The vehicle of claim 7, wherein opening the lift gate raises the package tray by rotating the package tray about the axis.

9. The vehicle of claim 7, wherein the container defines a plurality of receptacles.

10. The vehicle of claim 7, wherein the container defines a single receptacle.

11. A vehicle cargo area comprising:
    a package tray having an upper surface and a lower surface, wherein the package tray is pivotally attached in the cargo area, and rotated to uncover the cargo area;
    a container attached to the lower surface of the package tray; and an access panel being a lower side of the container, and openable to provide access inside the container upon rotation of the package tray to uncover the cargo area.

12. The cargo area of claim 11, wherein the package tray covers the cargo area when the upper surface is generally planar with a floor of the vehicle.

13. The cargo area of claim 11, wherein the cargo area has a plurality of walls and a hinge connecting to the package tray to the walls of the cargo area to rotate the package tray about the hinge.

14. The cargo area of claim 11, wherein the container is removable from the package tray.

15. The cargo area of claim 11, further comprising a handle connected to the upper surface of the package tray to facilitate rotating the package tray about the axis.

16. The cargo area of claim 11, wherein the container is a soft-sided pack.

* * * * *

UNITED STATES PATENT AND TRADEMARK OFFICE
CERTIFICATE OF CORRECTION

PATENT NO. : 9,701,251 B2  
APPLICATION NO. : 14/597248  
DATED : July 11, 2017  
INVENTOR(S) : Kathleen M. Parlow et al.

Page 1 of 1

It is certified that error appears in the above-identified patent and that said Letters Patent is hereby corrected as shown below:

In the Claims

Column 4, Lines 19-20, Claim 1:  
After "wherein the package tray"  
Delete "enclosing".

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*